Sept. 14, 1943.  M. B. MENTLEY  2,329,284

GEAR FINISHING TOOL

Original Filed March 25, 1940

INVENTOR.
MAX B. MENTLEY
BY *Whittemore, Hulbert*
*& Belknap* ATTORNEYS

Patented Sept. 14, 1943

2,329,284

UNITED STATES PATENT OFFICE 2,329,284

GEAR FINISHING TOOL

Max B. Mentley, Detroit, Mich., assignor to National Broach & Machine Company, Detroit, Mich., a corporation of Michigan Original application March 25, 1940, Serial No. 325,878. Divided and this application July 14, 1941, Serial No. 402,356

3 Claims. (Cl. 29—103)

The present invention relates to a gear finishing tool of the type which is adapted to be rotated in tight mesh with a gear to be finished, and to have a relative slippage introduced between the teeth of the tool and the teeth of the gear longitudinally of the gear teeth.

Tools of this general type are now well known to the art, and Drummond Patent 2,126,178, granted August 9, 1938, discusses this type of tool generally.

The present application is directed to a specific improvement over the tool disclosed in the Drummond patent referred to.

In certain types of gear finishing operations it has been found that a tool of this type is adapted to leave "serration marks" on the teeth of the gear being shaved. I have found that where the teeth are serrated in a particular novel manner, this tendency is largely avoided and the surface appearance of the shaved teeth is thereby improved. Specifically, cutting edges are provided on the faces of the teeth of the tool so as to extend therearound at a slight lead or in an irregular pattern.

It is accordingly an object of the present invention to provide a gear finishing tool having cutting edges arranged on the teeth in a particular manner.

Figure 1:
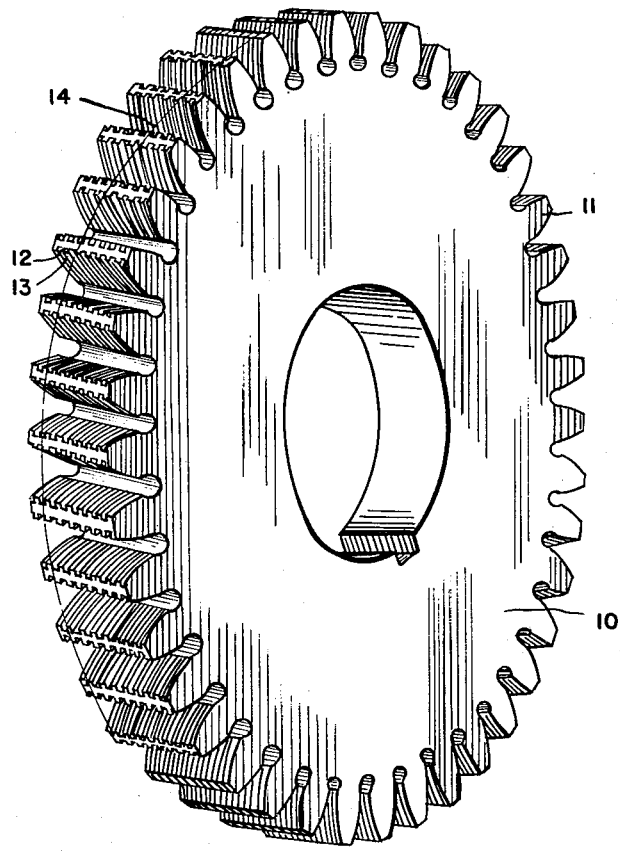
Figure 2:
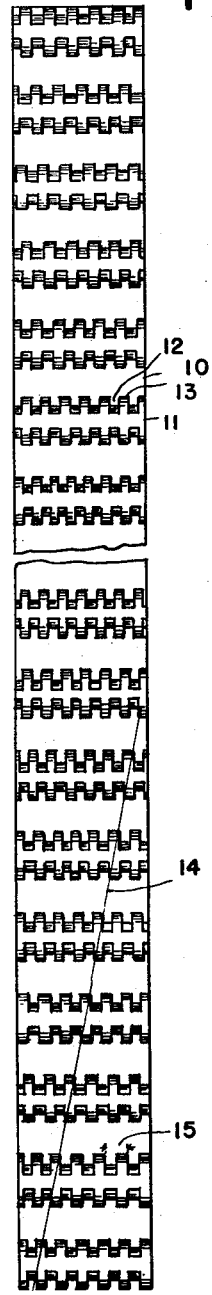

Other objects of the invention will be apparent as the description proceeds and when taken in conjunction with the accompanying drawing, wherein:

Figure 1 is a perspective of a gear finishing tool in accordance with the present invention; and Figure 2 is a developed plan view illustrating the arrangement of the cutting edges.

Prior practice in making gear cutting tools, as illustrated in the Drummond patent referred to above, was to provide grooves extending generally up and down the faces of the tool teeth, the grooves leaving intermediate ribs which provided guiding lands having cutting edges at their corners. Each tooth was provided with the same number of grooves in the same relationship, so that each tooth was identical with every other tooth. In certain types of gear finishing operations the pattern thus provided by the successive lands and cutting edges on the series of gear teeth resulted in forming a similar pattern on the teeth of the gear being shaved. Where the operation was carried out by rolling the gear and tool together at limited crossed axes and simultaneously providing relative translation between the two in a plane parallel to the axes of both, the tendency to form marks on the surface of the gear tooth was not present. However, in certain other methods of finishing a gear, the final finishing operation might be carried out by meshed rotation of the gear and tool unaccompanied by the relative translation referred to. In some cases other methods, which need not be considered here, resulted in the formation of the tool marks on the faces of the gear teeth.

I have found that when the serrations are provided so that they extend at a slight lead around the periphery of the tool there is no tendency for the formation of cutter marks.

The essential feature of the present invention is that the grooves which form the cutting edges in the surface of the tool teeth shall be located differently on different teeth. Conveniently they may be arranged at a uniform very slight lead, but this, while preferable, is not necessary.

In my prior copending application Serial No. 325,878, which has matured into Patent No. 2,278,792 of April 7, 1942, of which the present application is a division, I have shown a preferred method of forming the serrations in the teeth of the cutter. In this prior application, the tool blank being serrated, is mounted in threaded relation on a spindle so that as it is indexed around from tooth to tooth, it is given a slight displacement axially in accordance with the lead of the threads. The exact amount of lead is unimportant, except that it should have as a minimum a pitch equal to the spacing of adjacent grooves.

Referring specifically to the drawing, I have shown at 10 a tool of the class described having a plurality of teeth 11, each of which is provided with a parallel series of grooves 12 which provide intermediate ribs 13. In Figure 2, which is a developed plan view of the cutter shown in Figure 1, I have indicated by broken lines 14 the lead at which a series of serrations extends. This lead, in order that it shall be readily apparent, is greatly exaggerated, and in practice, as stated before, may be just sufficient to be equal to the spacing between adjacent grooves, as indicated near the bottom of Figure 2 by the dimension 15.

In finishing a gear with a tool of this character the number of the teeth in the tool will be different from the number of the teeth in the gear, so that each tooth of the gear is successively engaged by a large number, if not all of the teeth of the cutter. The cutting edges provided at the corners of the ribs 13 take a shaving cut on the surface of the work tooth extending generally up and down the tooth, but somewhat diagonally thereof. By providing the cutting edges as disclosed herein, each tooth of the tool as it engages the same tooth of the gear will take a different cut thereon, even though no relative translation is provided between the gear and tool.

Except for the avoidance of cutter marks on the face of the gear, the present tool operates in exactly the same manner as that disclosed in the prior Drummond patent referred to and for a more complete description of the same, reference is made to the prior patent.

As previously stated, it is desirable to provide the grooves on successive teeth in a helical path extending at a lead at least equal to the spacing of adjacent grooves on the same tooth. In other words, the serration should be arranged in a helical path which has a lead at least equal to the width of one groove plus one rib. By way of example, if a tooth is provided having the grooves provided at a spacing of .060 inch and if the tool has thirty teeth, it will be apparent that if the lead at which the grooves are provided on the successive teeth is equal to .060 inch, that upon rotation of the cutting tool like cutting edges will be presented in planes which are spaced by .002 inch axially of the cutter. In like manner, if the lead at which the grooves are arranged is equal to .120 inch so that in effect they define a two-thread arrangement, it will be apparent that upon rotation of the gear, like cutting edges will be presented in planes of rotation which are separated by .004 inch axially of the gear. Carrying out the same idea further, if the grooves are arranged to occupy helical paths extending around the gear having a lead equal to .240 inch, like cutting edges will be presented, upon rotation of the gear, in planes of rotation which are spaced apart .008 inch. If this is carried still further, it will be apparent that if the lead at which the grooves are provided is equal to .900 inch, the axial displacement between grooves of adjacent teeth is equal to .030 inch, with the result that the grooves on alternate teeth occupy the same plane of rotation. This is a condition which is illustrated in the prior Drummond patent referred to above in Figure 18, and is of course beyond the scope of the present invention.

To obtain practical results the cutter, according to the present invention, should have a lead which is determined by multiplying the width of a groove plus a rib, or the spacing of adjacent grooves, by a small whole number, such as from 1 to 5. As the lead is increased, the effectiveness of the cutter to obtain the results set forth is reduced, and optimum results are obtained when the lead referred to equals the width of a single groove and a single rib.

For purposes of comparison, it is pointed out that in Figure 18 of the Drummond patent the lead at which the grooves extend is equal to the width of one groove and one rib times the number of teeth divided by two.

As previously stated, it is unnecessary that the grooves be arranged to extend at a helical path, but it is desirable that the cutting edges formed by the corners of the ribs (that is defined by the intersection of the side walls of the grooves and the working surfaces or faces of the teeth) shall occupy, upon rotation of the cutter, planes which are spaced apart by equal amounts which are at most, and preferably substantially less than, one-third of the spacing of adjacent grooves.

While I have disclosed a single embodiment of my improved gear shaving tool, it will be understood that this has been done solely to enable those skilled in the art to practice the present invention, the scope of which is indicated by the appended claims.

What I claim as my invention is:

1. A gear cutter in the form of a gear, the teeth of said cutter having parallel, uniformly spaced grooves of equal width extending generally up and down the faces of said teeth, said grooves providing ribs therebetween, said ribs having cutting edges formed by the intersection of the side walls of said grooves and the faces of said teeth, the grooves on succeeding teeth of said cutter being arranged to extend in helical paths around said cutter at a lead substantially equal to the width of one groove plus one rib.

2. A gear cutter in the form of a gear, the teeth of said cutter having parallel, uniformly spaced grooves of equal width extending generally up and down the faces of said teeth, said grooves providing ribs therebetween, said ribs having cutting edges formed by the intersection of the side walls of said grooves and the faces of said teeth, the grooves on succeeding teeth of said cutter being arranged to extend in helical paths around said cutter at a lead substantially equal to a small whole number times the width of one groove plus one rib.

3. A gear cutter in the form of a gear, the teeth of said cutter having parallel, uniformly spaced grooves of equal width extending generally up and down the faces of said teeth, said grooves providing ribs therebetween, said ribs having cutting edges formed by the intersection of the side walls of said grooves and the faces of said teeth, the grooves on said teeth being arranged such that upon rotation of said cutter, the said cutting edges of all of said teeth define planes of rotation spaced axially of said cutter by an amount equal to S/N where S is the spacing of said grooves on one tooth surface and N is at least 3.

MAX B. MENTLEY.